(12) United States Patent  
Green (10) Patent No.: US 7,463,268 B2  
(45) Date of Patent: Dec. 9, 2008

(54) PROVIDING 3D GRAPHICS ACROSS PARTITIONS OF COMPUTING DEVICE

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 11/227,629

(22) Filed: Sep. 15, 2005

(65) Prior Publication Data

US 2007/0057953 A1 Mar. 15, 2007

(51) Int. Cl.
*G06F 15/167* (2006.01)
*G06F 9/46* (2006.01)

(52) U.S. Cl. ........................ 345/541; 718/104

(58) Field of Classification Search ................. 345/501, 345/502, 503, 541, 542; 718/1, 104
See application file for complete search history.

(56) References Cited

U.S. PATENT DOCUMENTS

2002/0129085 A1* 9/2002 Kubala et al. ............... 709/104
2002/0129172 A1* 9/2002 Baskey et al. ............... 709/310
2002/0129274 A1* 9/2002 Baskey et al. ............... 713/201

* cited by examiner

*Primary Examiner*—Ryan R Yang
(74) *Attorney, Agent, or Firm*—Woodcock Washburn LLP (57) ABSTRACT

A computing device has a graphics hardware device employed to display graphics on a display, and is partitioned to include a video services partition (VSP) instantiated at least in part to provide graphics capabilities, and also to include a video client partition (VCP) instantiated at least in part to consume such graphics capabilities. The graphics hardware device is assigned to and controlled by the VSP. A shared video memory module is shared by the VCP and the VSP such that graphics information placed in the pages shared by the video memory module by the VCP is directly available to the VSP for further action such that graphics commands from the VCP are shunted by way of the pages shared by the video memory module across partitions from the VCP to the VSP to be acted upon by the graphics hardware device as controlled by the VSP.

18 Claims, 4 Drawing Sheets

PROVIDING 3D GRAPHICS ACROSS PARTITIONS OF COMPUTING DEVICE

TECHNICAL FIELD

The present invention relates to a system for providing a high-performance function such as three-dimensional (3D) graphics capabilities from one virtual machine operating in a partition on a computing device to another virtual machine operating in a partition on a computing device. More particularly, the present invention relates to providing such a system that maximizes throughput so as to be able to handle the volume of input and output typically incumbent in such 3D graphics.

BACKGROUND OF THE INVENTION

As should be appreciated, a virtual machine is a software application operating on a computing device for the purpose of emulating a hardware system. Typically, although not necessarily, the virtual machine is employed on the computing device to host a user application or the like while at the same time isolating such user application from such computing device or from other applications on such computing device. A different variation of a virtual machine may be written for each of a plurality of different computing device so that any user application written for the virtual machine can be operated on any of the different computing devices. Thus, a different variation of the user application for each different computing device is not needed.

Virtual machines traditionally have been unable to achieve high-performance 3D graphics due to the limitations of prior approaches to providing such virtual machines with graphics capabilities. In particular, prior approaches focused on device emulation, or used the same graphics protocols used over a network, with associated copying overhead. However, 3D graphics in particular require advanced visual effects with higher visual quality, and can only function well if 3D acceleration with good performance and appropriate capabilities are available.

New architectures for computing devices and new software now allow a single computing device to run a plurality of partitions, each of which can be employed to instantiate a virtual machine to in turn host an instance of an operating system. In such a computing device, a graphics hardware device of the computing device such as a graphics card with a graphics processor may be dynamically assigned to a particular partition so that the particular partition can directly control such graphics hardware device. Such particular partition, acting as a provider of 3D or video acceleration and display capabilities or a 'video services partition' ('VSP'), can provide video services to another partition acting as a consumer of such capabilities or a 'video client partition' ('VCP'). Thus, the VCP must communicate with the VSP to accomplish graphics-related operations.

In the course of a virtual machine emulating hardware, a significant amount of resources are consumed by inefficiencies associated with software emulation of each virtual hardware device. Thus, in the case of the VCP accessing the graphics hardware device in the course of performing video services, such inefficiencies and the overhead and complexity of device emulation may be overwhelming to the point that emulating the graphics hardware device is impractical. Even if proper emulation is achieved, performance is likely below acceptable standards due to the large amount of software processing required to emulate the graphics hardware device. Principally, such unacceptable performance is due to the fact that graphics data associated with the memory of one virtual machine must be transferred to the memory of another virtual machine in the course of producing graphics.

As may be appreciated, an analogous situation to one partition performing graphics services for another partition on a computing device may be one networked computing device providing graphics displaying services for a separate networked computing device according to a network graphics protocol. However, such a protocol likely does not provide for direct data sharing, and at times provides a more restrictive graphics interface to the producer of the graphics than is actually available locally to the displayer of such graphics.

Accordingly, a need exists for a system that allows a VSP on a computing device to provide high performance 3D graphics services to a VCP on the computing device. In particular, a need exists for such a system that allows the VSP to share resources and capabilities associated with the graphics hardware device with the VCP such that the VCP and VSP can directly share graphics data and the VCP can employ the same graphics interface that is available to the VSP at high performance.

SUMMARY OF THE INVENTION

The aforementioned needs are satisfied at least in part by the present invention in which a computing device has a graphics hardware device employed to display graphics on a display coupled to the computing device, and the computing device is partitioned to include a video services partition (VSP) instantiated at least in part to provide graphics capabilities, and also to include a video client partition (VCP) instantiated at least in part to consume such graphics capabilities. The graphics hardware device is assigned to and controlled in part by the VSP.

The VCP has a user mode portion of a graphics driver (UMD) in a user mode portion of such VCP, where the UMD corresponds to and is developed for the graphics hardware device. The UMD receives graphics commands from an application at a user mode portion of the VCP and processes such commands to produce graphics commands that the graphics hardware device may utilize to produce graphics. The VCP also has a user mode runtime module in the user mode portion of such VCP for assisting the UMD in processing and delivering graphics commands of a particular type.

The VSP has a partition graphics context object in a kernel mode portion of such VSP, where the partition graphics context object corresponds to the VCP and represents the graphics state relating to the graphics hardware device with regard to the VCP. The VSP also has a kernel mode portion of the graphics driver (KMD) in the kernel mode portion of such VSP, where the KMD corresponds to and is developed for the graphics hardware device and also corresponds to the UMD. The KMD directly controls the graphics hardware device. The VSP in addition has a kernel mode runtime module in the kernel mode portion of such VSP, where the kernel mode runtime module corresponds to the user mode runtime module in the VCP for assisting the KMD in processing and delivery of graphics command of the particular type and for maintaining state for the graphics hardware device with regard to the VCP in the partition graphics context object.

The computing device also includes a shared video memory module shared by the VCP and the VSP, with a portion in the VCP and a portion in the VSP. The portions share pages of memory between the VCP and the VSP and manage graphics-related cross-partition notifications. Graphics information placed in the shared video memory module by the VCP is directly available to the VSP for further action such that graphics commands from the VCP are shunted by way of the shared video memory module across partitions from the VCP to the VSP to be acted upon by the graphics hardware device as controlled by the VSP.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
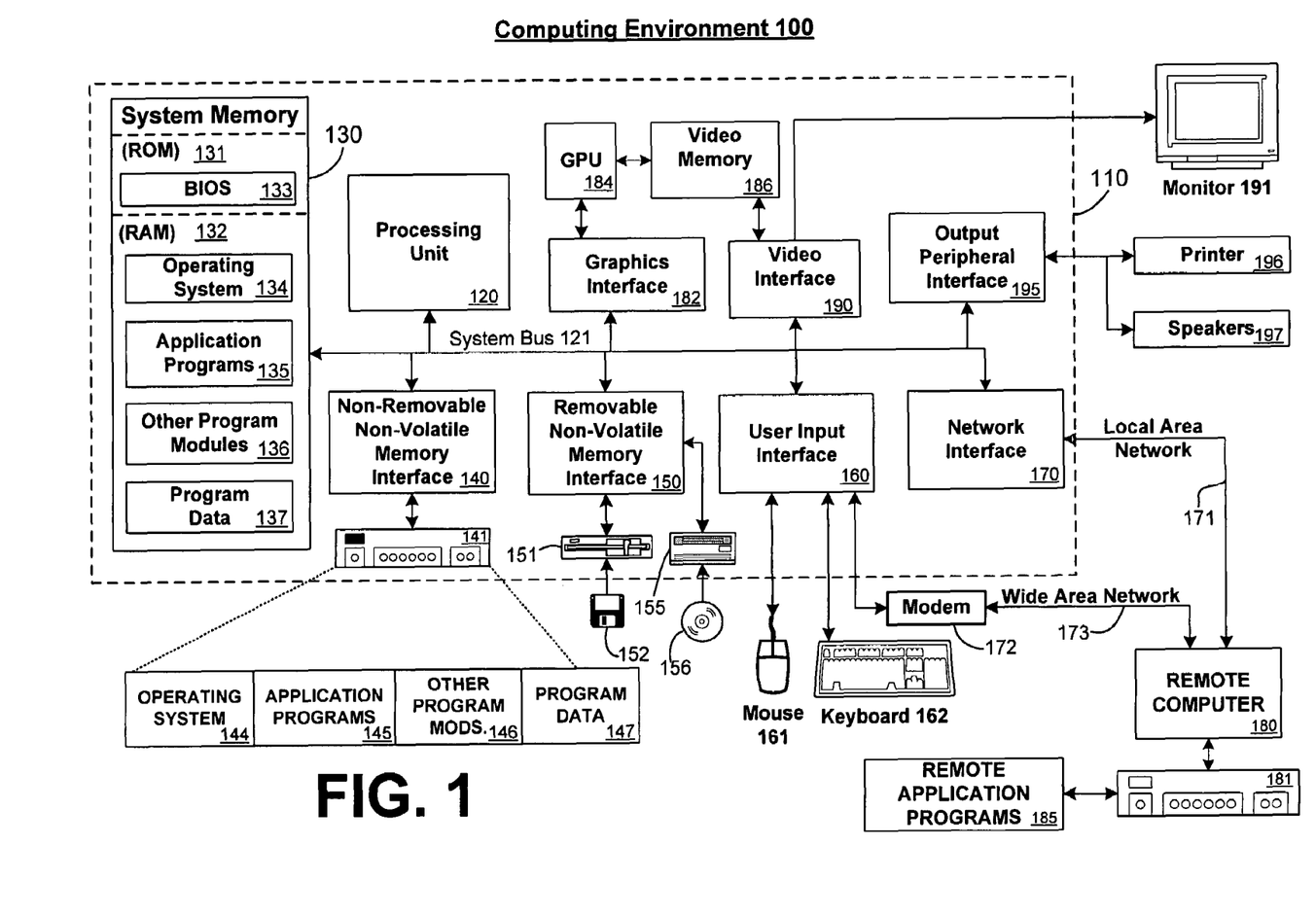
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
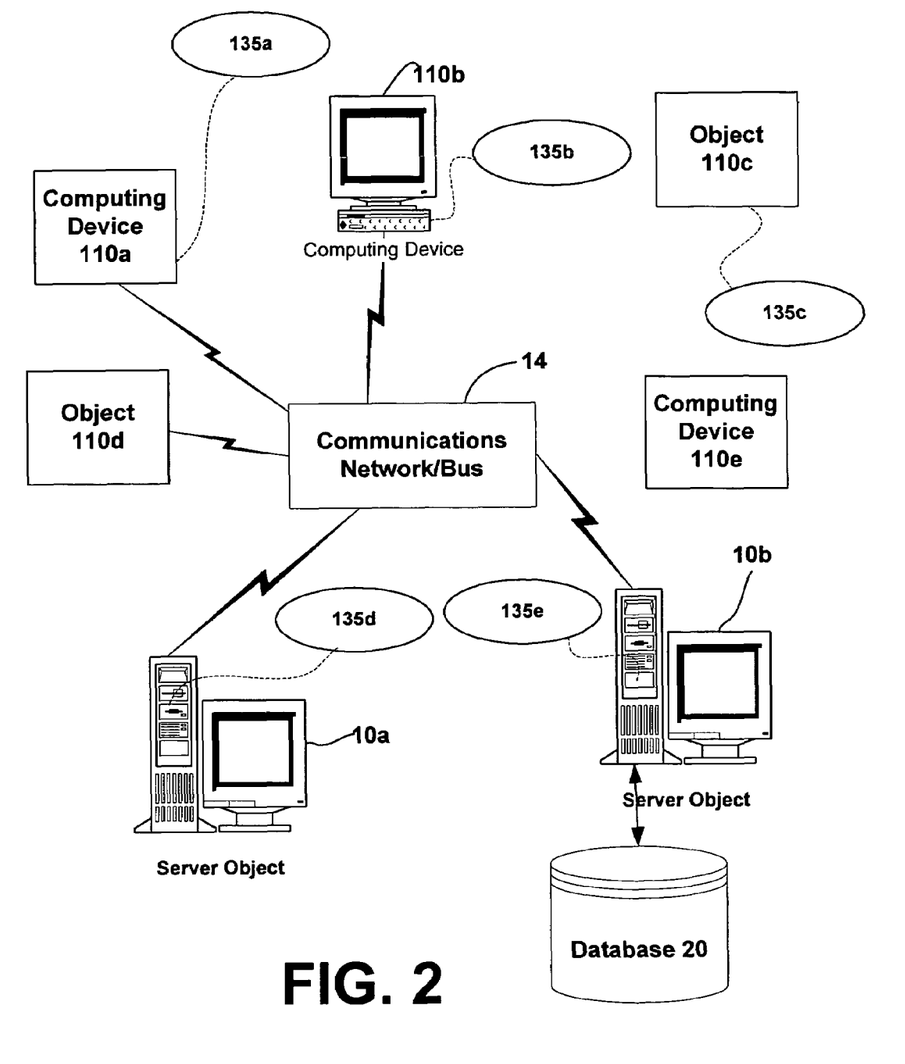
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5 even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc.

that may interact with client computers 110*a*, 110*b*, etc. and other devices 111 and databases 20.

Providing 3D Graphics Across Partitions of Computing Device

Figure 3:
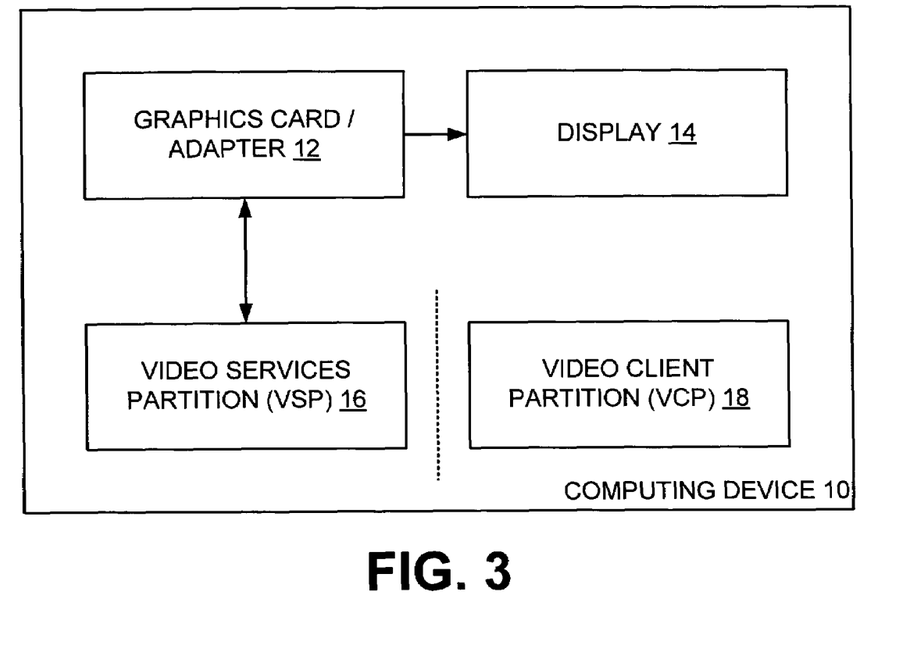
FIG. 3 is a block diagram showing a computing device running a plurality of partitions including a video services partition that owns a graphics hardware device and provides graphics services and a video client partition that employs the graphics services of the videos services partition in connection with embodiments of the present invention.

Turning now to FIG. 3, a computing device 10 includes a hardware graphics hardware device 12 that is employed to display 3D graphics or the like on a display 14 coupled to the computing device 10. The computing device 10 has been partitioned to include a video services partition (VSP) 16 instantiated at least in part to provide 3D or video acceleration and display capabilities, and also to include a video client partition (VCP) 18 instantiated at least in part to consume such capabilities. As shown, the graphics hardware device 12 has been dynamically assigned to the VSP 16 and thus is under the direct control of such VSP 16.

In the present invention, the VSP 16 and VCP 18 are configured such that the VSP 16 provides high performance processing such as 3D graphics to the VCP 18. In addition, the VSP 16 is configured to provide such high performance processing to a plurality of such VCPs 18. In particular, and as will be set forth in more detail below, each VCP 18 accessing the VSP 16 is represented therein by a partition graphics context object 20 (FIG. 4) that provides for the VCP 18 certain pieces of the graphics stack and other items that are unique to each VCP 18, among other things.

Normally, graphics software managing a graphics hardware device 12 has certain state that is relevant to the graphics hardware device 12 and not to any particular process, where at least some of the state of the graphics hardware device 12 is visible or settable by processes. With the partition graphics context object 20 for each VCP 18, each VCP 18 can get a distinct copy of such state so that processes within the VCP 18 see such distinct copy of such state. As may be appreciated, the state as represented by any particular partition graphics context object 20 can be swapped in to become the corresponding real state of the graphics hardware device 12. Such swapping in of state is accomplished without disrupting semantics seen by each VCP 18. By way of example and not limitation, such state may include the set of graphics data regions that the VCP 18 has configured to display on a graphics output device.

As may be appreciated, the partition graphics context object 20 may contain the collection of visible graphics surfaces currently being virtually output to virtual displays by the VSP 16. Such visible graphics surfaces may or may not be actually visible on actual display output hardware at any given time. The partition graphics context object 20 may also contain a collection of representations of graphics rendering contexts that have been created by the VSP 16. Such graphics rendering contexts are distinct from the partition graphics context object 20.

Figure 4:
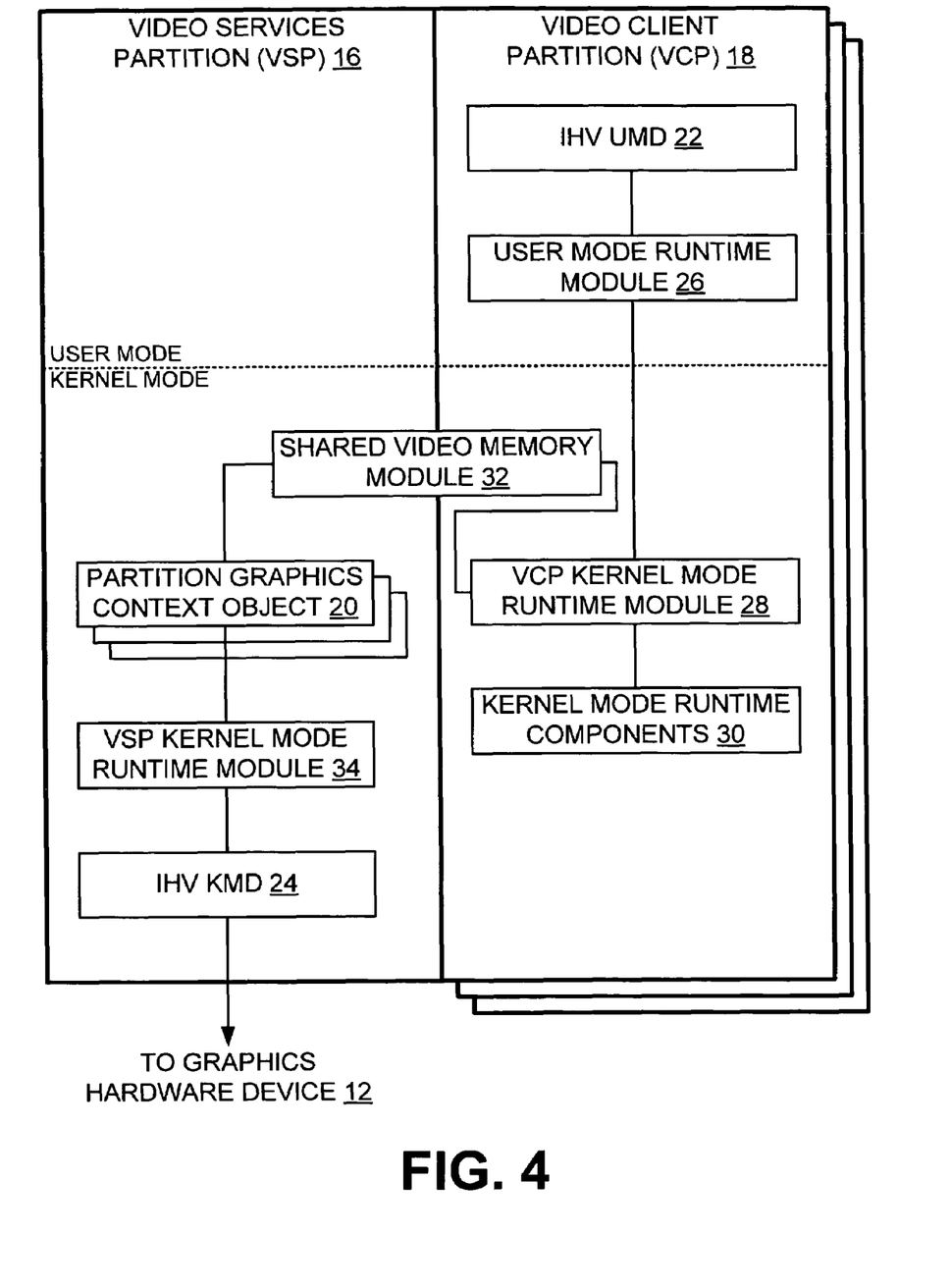
FIG. 4 is a flow diagram showing key elements within the video client partition and the video services partition of FIG. 3 in accordance with one embodiment of the present invention.

Turning now to FIG. 4, it is seen that graphics operations initiated by the VCP 18 and serviced by the VSP 16 are serviced by the following elements in the following manner. FIG. 4 presumes that the computing device 10 of FIG. 3 and each partition 16, 18 thereof are functionally operated to include both a user mode and a kernel mode. As may be appreciated, the user mode is a generally non-privileged state where executing code is forbidden by the hardware from performing certain operations, such as for example writing to memory not assigned to such code. Generally such forbidden operations are those which could destabilize the operating system or constitute a security risk. In terms of the operating system, the user mode is an analogous non-privileged execution mode where the running code is forbidden by the kernel from performing potentially dangerous operations such as writing to system configuration files, killing other processes, rebooting the system, and the like.

As may also be appreciated, the kernel mode or privileged mode is the mode in which the operating system and related core components run. Code running in the kernel mode has unlimited access to the system memory and external devices that are assigned to the partition 16, 18. Generally, the amount of code running in kernel mode is minimized, both for purposes of security and elegance. Roughly speaking, a user of a computing device 10 interfaces therewith most directly through the user mode and applications operating therein, while the computing device 10 interfaces with external devices, including the graphics hardware device 12, most directly through the kernel mode.

With the user and kernel modes as set forth above, then, and still referring to FIG. 4, it is seen that in one embodiment of the present invention the VCP 18 has in the user mode portion thereof a user mode portion of a graphics driver 22 as written by an independent hardware vendor (IHV UMD 22). Presumably, the IHV UMD 22 receives graphics commands from some application at the user mode of the VCP 18 and processes such commands to produce graphics commands that may be executed by the graphics hardware device 12 to produce graphics. A user mode portion of a graphics driver as written by an independent hardware vendor is generally known or should be apparent to the relevant public and therefore need not be set forth herein in any detail. Accordingly, the IHV UMD 22 may be any appropriate IHV UMD 22 without departing from the spirit and scope of the present invention. Critically, and as should now be understood, in the present invention, the IHV UMD 22 runs in the VCP 18 even though the corresponding independent hardware vendor kernel mode driver 24 (IHV KMD 24) is running in the kernel mode portion of the VSP 16 and not in the kernel mode portion of the VCP 18.

Note that just as the VCP 18 has an instance of the IHV UMD 22 to handle graphics commands from applications running at such VCP 18, so too may the VSP 16 have an instance of the IHV UMD 22 to handle graphics commands from applications running at such VSP 16 (not shown). Of course, in the special case of the VSP 16, all graphics commands are processed entirely within such VSP 16 and need not be forwarded across partitions 16, 18.

The VCP 18 may have in the user mode portion thereof one or more user mode runtime modules 26. As may be appreciated, the user mode runtime module 26 assists the IHV UMD 22 in processing graphics commands. By way of example and not limitation, a first user mode runtime module 26 may be employed to help in processing graphics commands of a first type, a second user mode runtime module 26 may be employed to help in processing graphics commands of a second type, etc. A user mode runtime module 26 is generally known or should be apparent to the relevant public and therefore need not be set forth herein in any detail. Accordingly, each user mode runtime module 26 may be any appropriate user mode runtime module without departing from the spirit and scope of the present invention. Typically, such a user mode runtime module 26 may at appropriate times call into a corresponding VCP kernel mode runtime module 28 in the kernel portion of the VCP 18 to initiate graphics operations, adjust state at the graphics hardware device 12, and the like.

The VCP kernel mode runtime module 28 in the kernel portion of the VCP 18 is as was alluded to above the module in such kernel portion of such VCP 18 that assists in processing graphics commands. As with the user mode runtime module 26, the VCP kernel mode runtime module 28 is generally known or should be apparent to the relevant public and therefore need not be set forth herein in any detail. Accordingly, the VCP kernel mode runtime module 28 may be any appropriate kernel mode runtime module without departing from the spirit and scope of the present invention. Note that inasmuch as graphics commands may potentially emanate from with the kernel mode portion of the VCP 18, such VCP 18 may also have in such kernel portion thereof provision for receiving graphics commands from kernel mode components 30 that make direct calls into the VCP kernel mode runtime module 28.

Absent the present invention and in the prior art case, a call into the kernel mode runtime module 28 would result in graphics operations being scheduled and memory being managed in the same partition 16, 18 in which the call is made. However, with the present invention, and critically, the calls, operations, related memory pages, and other related information are shunted or shared between the VCP 18 and the VSP 16. The capability to share between the VCP 18 and the VSP 16 is an integral part of the invention inasmuch as the VSP 16 controls the graphics hardware device 12 and not the VCP 18.

Still referring to FIG. 4, the aforementioned capability to share between the VCP 18 and the VSP 16 is achieved in one embodiment of the present invention by way of a shared video memory module 32. As seen, such shared video memory module 32 may be constructed to include two portions, one in the VCP 18 and the other in the VSP 16. Together, the two portions share appropriate pages of memory between the two partitions 16, 18 and manage graphics-related cross-partition notifications. The shared video memory module 32 although not generally known should nevertheless be apparent to the relevant public and therefore need not be set forth herein in any detail. Accordingly, the shared video memory module 32 may be any appropriate shared video memory module without departing from the spirit and scope of the present invention.

Note that in general, a partition 16, 18 cannot access memory owned by another partition 16, 18 unless the owning partition 16, 18 gives explicit permission. Therefore, in order for a process in the VCP 18 to access the contents of a graphics allocation, the memory pages that back such graphics allocation must be explicitly shared by the VSP 16 to the VCP 18 by the shared video memory module 32.

Accordingly, and critically, with the shared video memory module 32, graphics commands, information, and the like as generated by the IHV UMD 22 in the user mode portion of the VCP 18 may be placed by the IHV UMD 22 or the like in the pages that have been shared by the shared video memory module 32, and by doing so such graphics commands, information, and the like are directly available to the corresponding IHV KMD 24 running in the kernel mode portion of the VSP 16 for further action. Significantly, such graphics command, information, and the like need not be copied, reformatted, re-transmitted, or the like, with the result being that graphics can be executed with high performance and throughput and with less overhead and superfluous action.

As was noted above, the VSP 16 is configured to provide high performance processing to a plurality of such VCPs 18 and thus has for each VCP 18 accessing the VSP 16 a corresponding partition graphics context object 20 that provides for the VSP 18 state that is relevant to the graphics hardware device 12, where such state includes certain pieces of the graphics stack and other items that are unique to each VCP 18, among other things. Each VCP 18 thus has a corresponding distinct instance of state information so that processes within the VCP 18 see such appropriate instance of such state. As may be appreciated, the state information set forth in the partition graphics context object 20 for each corresponding VCP 18 is known or should be apparent to the relevant public and therefore need not be set forth herein in any detail. Accordingly, such state information may be any appropriate state information without departing from the spirit and scope of the present invention.

In the prior art, and as may be appreciated, the VCP kernel mode runtime module 28 in the kernel portion of the VCP 18 would perform most functionality associated with scheduling graphics commands and rendering of graphics to the graphics hardware device 12 and most functionality associated with managing graphics memory allocations. However, inasmuch as the VSP 16 is now performing such functionality, the VSP 16 in one embodiment of the present invention has a VSP kernel mode runtime module 34 in the kernel portion of such VSP 16 to in fact perform such functionality. Thus, the VCP kernel mode runtime module 28 now need not perform most of the aforementioned functionality, and if in fact the VCP kernel mode runtime module 28 does include such functionality, such included functionality is not employed unless for some reason the VCP 18 becomes a VSP 16 at some point.

To summarize, then, in the present invention, the VSP kernel mode runtime module 34 in the VSP 16 is active and is used to satisfy graphics requests made by code running in both partitions 16, 18. The path from processes and kernel mode modules in the VSP 16 (not shown) is similar to the path from processes in the VCP 18 except that the path in the VSP 16 leads directly to the VSP kernel mode runtime module 34 rather than indirectly by cross-partition sharing, as with the VCP 18. Note that in the present invention, the VSP kernel mode runtime module 34 includes functionality necessary to address the multiple partition graphics context objects 20. Thus, such VSP kernel mode runtime module 34 treats each partition graphics context object 20 as if a separate machine graphics context, with a separate set of corresponding active display surfaces and the like.

As may be appreciated, in the present invention, the VSP kernel mode runtime module 34 includes a graphics memory manager and a graphics scheduler. Such manager and such scheduler are each a single instance that are respectively concerned with each VCP 18 instantiated on the computing device 10 and in particular each graphics command emanating therefrom. Thus, such manager and such scheduler remain part of the true per-graphics hardware device 12 state and are not duplicated, as is the case with state in the partition graphics context object 20. The video memory manager of the VSP kernel mode runtime module 34 manages memory that is used to hold graphics-related allocations. Such memory can be video RAM, regular RAM, or the like. The video scheduler of the VSP kernel mode runtime module 34 schedules when individual contexts from VCPs 18 are allowed to run on the graphics processing unit of the graphics hardware device 12. Because the video memory manager and video scheduler are managing memory and scheduling for all graphics rendering contexts regardless of which partition 16, 18 graphics rendering contexts are associated with, the present invention is highly efficient. In particular, it is much more efficient to have a single video memory manager and video scheduler managing all graphics memory and scheduling rather than to have such functionality split across partitions 16, 18.

As was disclosed above, in the present invention, with the IHV UMD 22 running in the user mode portion of the VCP 18, a corresponding independent hardware vendor kernel mode driver 24 (IHV KMD 24) is running in the kernel mode portion of the VSP 16 and not in the kernel mode portion of the VCP 18. As may be appreciated, such IHV KMD 24 directly controls the graphics hardware device 12 and is not necessarily aware of the fact that some of the graphics commands are coming from a different partition 18. Such IHV KMD 24 as written by an independent hardware vendor is generally known or should be apparent to the relevant public and therefore need not be set forth herein in any detail. Accordingly, the IHV KMD 24 may be any appropriate IHV KMD 24 without departing from the spirit and scope of the present invention. Note that with the IHV KMD 24 in the kernel mode portion of the VSP 16, the kernel mode portion of the VCP 18 need not have any such IHV KMD 24, unless for some reason the VCP 18 becomes a VSP 16 at some point. As should now be evident, no IHV KMD 24 is needed at the VCP 18 inasmuch as the VCP 18 does not actually have primary control of the graphics hardware device 12. Instead, all graphics operation and state management operation command pathways are set up and managed by the VSP 16 that controls the graphics hardware device 12.

As may be appreciated, the present invention is particularly useful in connection with a computer-type user interface that can utilize high-performance 3D graphics capabilities of a graphics hardware device 12 to draw a graphically-rich interface. Thus, advanced visual effects are provided, with higher visual quality than is possible using older 2D-only graphics. However, such an interface can only function well if 3D acceleration with good performance and appropriate capabilities is available. Correspondingly, video playback is provided, using accelerated scaling and color space conversion capabilities of the graphics hardware device 12. Both the advanced visual effects and the video playback capabilities benefit from the relatively high performance and support for myriad graphics capabilities offered by the present invention, which can function with existing graphics hardware devices 12 and also with future generation graphics hardware devices 12.

The present invention relies on work already accomplished that allows multiple partitions 16, 18, etc. to be operating on a computing device 10, each partition essentially comprising a virtual machine running a separate operating system or the like. In variations of the present invention:

A portion of a graphics driver runs in the VCP 18, resulting in what is believed to be a maximum performance since work performed in the VCP 18 is not repeated in the VSP 16;

No portion of the graphics driver runs in the VCP 18, which functions as long as the graphics interface of the VSP 16 is backward-compatible with the graphics interface of the VCP 16—strict compatibility call-for-call is not required as long as high-performance translation is provided from the VCP 18 graphics interface to the VSP 16 graphics interface.

With the present invention, the desktop surface may be shared between VCPs 18 such that the contents of the desktop surface of a first VCP 18 can be drawn onto the desktop surface of a second VCP 18. Likewise, two VCPs 18 can share a desktop surface so that at least some processes running in one VCP 18 appear on the desktop surface of the other VCP 18. Such a function can be employed to simulate processes running in the same partition 18 even though actually running in separate partitions 18.

The present invention can be employed to implement a protected video path by creating one or more trusted partitions 18 that are trusted not to divulge content flowing through such path, and by restricting the sharing of memory pages that contain protected media to other partitions 18 that are also trusted. Here, the graphics hardware device 12 would be assigned to a trusted partition 16. Restricting the sharing of any pages here would include restricting the sharing of pages that are the result of a rendering operation that used protected content as a source, such as a displayed primary surface of a trusted partition 18. In effect, any page that is an output of a render operation becomes protected media if any input of the render operation was protected media.

Since only trusted partitions 18 would have access to protected content, any mixing of protected and non-protected content must be done by a trusted partition 18, and once mixed, the result remains protected content. Similarly, protected content can be shared only among partitions 18 that are all trusted. Note, though, that in some instances a trusted partition 18 may allow a non-trusted partition 18 to specify certain items, such as for example the screen position of protected content. Such a non-trusted partition 18 thus can be permitted to do most of the work of visually decorating a graphics pane, with the result being that the amount of code in the trusted partition 18 is minimized, and also that protected content can be displayed in a visually mixed manner with non-protected content.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a system is provided that allows a VSP 16 on a computing device 10 to provide high performance 3D graphics services to a VCP 18 on the computing device 10. The VSP 16 shares resources and capabilities associated with a graphics hardware device 12 with the VCP 18 such that the VCP 18 and VSP 16 can directly share graphics data and the VCP 18 can employ the same graphics interface that is available to the VSP 16 at high performance.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computing device having a hardware device employed to perform a hardware function, the computing device being partitioned to include a service partition (SP) instantiated at least in part to provide capabilities relating to the hardware device, and also to include a client partition (CP) instantiated at least in part to consume such capabilities, the hardware device being assigned to and controlled by the SP, the CP having:
a user mode portion of a hardware device driver (UMD) in a user mode portion of such CP, the UMD corresponding to and being developed for the hardware device, the UMD for receiving commands from an application at a user mode portion of the CP and for processing such commands to produce actions to be taken by the hardware device; and
a user mode runtime module in the user mode portion of such CP for assisting the UMD in processing commands of a particular type; and the SP having:
a partition hardware context object in a kernel mode portion of such SP, the partition hardware context object corresponding to the CP and representing a distinct instance of state for the hardware device with regard to the CP;
a kernel mode portion of the hardware device driver (KMD) in the kernel mode portion of such SP, the KMD corresponding to and being developed for the hardware device and also corresponding to the UMD, the KMD for directly controlling the hardware device;

a kernel mode runtime module in the kernel mode portion of such SP, the kernel mode runtime module corresponding to the user mode runtime module in the CP for assisting the KMD in processing commands and for maintaining state for the hardware device with regard to the CP in the partition hardware context object;

the computing device also including a shared memory module shared by the CP and the SP, with a portion in the CP and a portion in the SP, the portions sharing pages of memory between the CP and the SP and managing related cross-partition notifications, whereby hardware device information placed in the pages shared by the memory module by the CP is directly available to the SP for further action, wherein commands from the CP are shunted by way of the pages shared by the memory module across partitions from the CP to the SP to be acted upon by the hardware device as controlled by the SP.

2. The computing device of claim 1 having a graphics hardware device employed to display graphics on a display coupled to the computing device, the computing device being partitioned to include a video services partition (VSP) instantiated at least in part to provide graphics capabilities, and also to include a video client partition (VCP) instantiated at least in part to consume such graphics capabilities, the graphics hardware device being assigned to and controlled by the VSP, the VCP having:
a user mode portion of a graphics driver (UMD) in a user mode portion of such VCP, the UMD corresponding to and being developed for the graphics hardware device, the UMD for receiving graphics commands from an application at a user mode portion of the VCP and for processing such commands to produce graphics commands interpretable by the graphics hardware device; and
a user mode runtime module in the user mode portion of such VCP for assisting the UMD in processing graphics commands; and the VSP having:
a partition graphics context object in a kernel mode portion of such VSP, the partition graphics context object corresponding to the VCP and representing a distinct instance of state for the graphics hardware device with regard to the VCP;
a kernel mode portion of the graphics driver (KMD) in the kernel mode portion of such VSP, the KMD corresponding to and being developed for the graphics hardware device and also corresponding to the UMD, the KMD for directly controlling the graphics hardware device;
a kernel mode runtime module in the kernel mode portion of such VSP, the kernel mode runtime module corresponding to the user mode runtime module in the VCP for assisting the KMD in processing graphics commands and for maintaining state for the graphics hardware device with regard to the VCP in the partition graphics context object;

the computing device also including a shared video memory module shared by the VCP and the VSP, with a portion in the VCP and a portion in the VSP, the portions sharing pages of memory between the VCP and the VSP and managing graphics-related cross-partition notifications, whereby graphics information placed in the pages shared by the video memory module by the VCP is directly available to the VSP for further action, wherein graphics commands from the VCP are shunted by way of the pages shared by the video memory module across partitions from the VCP to the VSP to be acted upon by the graphics hardware device as controlled by the VSP.

3. The computing device of claim 2 partitioned to include a plurality of the VCPs, each VCP being instantiated at least in part to consume the graphics capabilities of the VSP, the VSP having a partition graphics context object corresponding to each VCP, each partition graphics context object representing a distinct instance of state for the graphics hardware device with regard to the corresponding VCP, whereby the state as represented by any particular partition graphics context object can be swapped in to become the corresponding real state of the graphics hardware device.

4. The computing device of claim 3 wherein the kernel mode runtime module of the VSP includes functionality necessary to address each of the plurality of partition graphics context objects, whereby such kernel mode runtime module treats each partition graphics context object as if a separate machine graphics context, with a separate corresponding set of active display surfaces.

5. The computing device of claim 3 wherein the kernel mode runtime module of the VSP includes a graphics memory manager and a graphics scheduler, such manager and such scheduler each being a single instance, the graphics memory manager for managing memory that is used to hold graphics-related allocations, the graphics scheduler for scheduling when individual rendering contexts from VCPs are allowed to run on the graphics hardware device.

6. The computing device of claim 2 wherein a user mode portion of the VSP also has an instance of the UMD to handle graphics commands from applications running at the user mode portion of such VSP.

7. The computing device of claim 2 wherein the VCP has a plurality of user mode runtime modules, each user mode runtime module for assisting the UMD in processing graphics commands of a particular type, and wherein the VSP has a plurality of kernel mode runtime modules, each kernel mode runtime module in the VSP corresponding to a user mode runtime module in the VCP.

8. The computing device of claim 2 wherein the VSP owns the shared video memory module and shares same with the VCP so that the VCP can access such shared video memory module.

9. The computing device of claim 2 wherein the VCP and the VSP are each a trusted partition and form a trusted graphics path trusted not to divulge content flowing therethrough.

10. A computer-readable storage medium having stored thereon instructions for being implemented on a computing device having a hardware device employed to perform a hardware function, the instructions for partitioning the computing device to include a service partition (SP) instantiated at least in part to provide capabilities relating to the hardware device, and also to include a client partition (CP) instantiated at least in part to consume such capabilities, the hardware device being assigned to and controlled by the SP, the CP having:
a user mode portion of a hardware device driver (UMD) in a user mode portion of such CP, the UMD corresponding to and being developed for the hardware device, the UMD for receiving commands from an application at a user mode portion of the CP and for processing such commands to produce actions to be taken by the hardware device; and a user mode runtime module in the user mode portion of such CP for assisting the UMD in processing commands; and the SP having:

a partition hardware context object in a kernel mode portion of such SP, the partition hardware context object corresponding to the CP and representing a distinct instance of state for the hardware device with regard to the CP;

a kernel mode portion of the hardware device driver (KMD) in the kernel mode portion of such SP, the KMD corresponding to and being developed for the hardware device and also corresponding to the UMD, the KMD for directly controlling the hardware device;

a kernel mode runtime module in the kernel mode portion of such SP, the kernel mode runtime module corresponding to the user mode runtime module in the CP for assisting the KMD in processing commands and for maintaining state for the hardware device with regard to the CP in the partition hardware context object;

the instructions also for instantiating on the computer device a shared memory module shared by the CP and the SP, with a portion in the CP and a portion in the SP, the portions sharing pages of memory between the CP and the SP and managing related cross-partition notifications, whereby hardware device information placed in the shared memory module by the CP is directly available to the SP for further action, wherein commands from the CP are shunted by way of the pages shared by memory module across partitions from the CP to the SP to be acted upon by the hardware device as controlled by the SP.

11. The medium of claim 10 wherein the computing device has a graphics hardware device employed to display graphics on a display coupled to the computing device, the instructions for partitioning the computing device to include a video services partition (VSP) instantiated at least in part to provide graphics capabilities, and also to include a video client partition (VCP) instantiated at least in part to consume such graphics capabilities, the graphics hardware device being assigned to and controlled by the VSP, the VCP having:

a user mode portion of a graphics driver (UMD) in a user mode portion of such VCP, the UMD corresponding to and being developed for the graphics hardware device, the UMD for receiving graphics commands from an application at a user mode portion of the VCP and for processing such commands to produce graphics commands interpretable by the graphics hardware device; and a user mode runtime module in the user mode portion of such VCP for assisting the UMD in processing graphics commands; and the VSP having:

a partition graphics context object in a kernel mode portion of such VSP, the partition graphics context object corresponding to the VCP and representing a distinct instance of state for the graphics hardware device with regard to the VCP;

a kernel mode portion of the graphics driver (KMD) in the kernel mode portion of such VSP, the KMD corresponding to and being developed for the graphics hardware device and also corresponding to the UMD, the KMD for directly controlling the graphics hardware device;

a kernel mode runtime module in the kernel mode portion of such VSP, the kernel mode runtime module corresponding to the user mode runtime module in the VCP for assisting the KMD in processing graphics commands and for maintaining state for the graphics hardware device with regard to the VCP in the partition graphics context object;

the instructions also for instantiating on the computer device a shared video memory module shared by the VCP and the VSP, with a portion in the VCP and a portion in the VSP, the portions sharing pages of memory between the VCP and the VSP and managing graphics-related cross-partition notifications, whereby graphics information placed in the shared video memory module by the VCP is directly available to the VSP for further action, wherein graphics commands from the VCP are shunted by way of the pages shared by the video memory module across partitions from the VCP to the VSP to be acted upon by the graphics hardware device as controlled by the VSP.

12. The medium of claim 11 wherein the computing device is partitioned to include a plurality of the VCPs, each VCP being instantiated at least in part to consume the graphics capabilities of the VSP, the VSP having a partition graphics context object corresponding to each VCP, each partition graphics context object representing a distinct copy of state for the graphics hardware device with regard to the corresponding VCP, whereby the state as represented by any particular partition graphics context object can be swapped in to become the corresponding real state of the graphics hardware device.

13. The medium of claim 12 wherein the kernel mode runtime module of the VSP includes functionality necessary to address each of the plurality of partition graphics context objects, whereby such kernel mode runtime module treats each partition graphics context object as if a separate machine graphics context, with a separate corresponding set of active display surfaces.

14. The medium of claim 12 wherein the kernel mode runtime module of the VSP includes a graphics memory manager and a graphics scheduler, such manager and such scheduler each being a single instance, the graphics memory manager for managing memory that is used to hold graphics-related allocations, the graphics scheduler for scheduling when individual contexts from VCPs are allowed to run on the graphics hardware device.

15. The medium of claim 11 wherein a user mode portion of the VSP also has an instance of the UMD to handle graphics commands from applications running at the user mode portion of such VSP.

16. The medium of claim 11 wherein the VCP has a plurality of user mode runtime modules, each user mode run time module for assisting the UMD in processing graphics commands of a particular type, and wherein the VSP has a plurality of kernel mode runtime modules, each kernel mode runtime module in the VSP corresponding to a user mode runtime module in the VCP.

17. The medium of claim 11 wherein the VSP owns the shared video memory module and shares same with the VCP so that the VCP can access such shared video memory module.

18. The medium of claim 11 wherein the VCP and the VSP are each a trusted partition and form a trusted graphics path trusted not to divulge content flowing therethrough.

* * * * *